United States Patent [19]
Morris

[11] Patent Number: 5,267,466
[45] Date of Patent: Dec. 7, 1993

[54] APPARATUS AND METHOD FOR CALIBRATING A SUSPENSION CONTROL MODULE

[75] Inventor: Peter T. Morris, Northville, Mich.

[73] Assignee: Ford Motor Co., Dearborn, Mich.

[21] Appl. No.: 765,803

[22] Filed: Sep. 26, 1991

[51] Int. Cl.⁵ .................. G01D 18/00; B60G 17/015
[52] U.S. Cl. ..................... 73/1 J; 280/707;
    364/424.05; 364/571.05
[58] Field of Search .......................... 73/1 J;
    364/571.01–571.08, 562, 424.05; 280/688, 715,
    840, 6.1, 702, 707

[56] References Cited

U.S. PATENT DOCUMENTS

| | | | |
|---|---|---|---|
| 3,453,740 | 7/1969 | Sakamoto | 33/203.13 |
| 4,483,546 | 11/1984 | Brearley | 280/6 R |
| 4,517,832 | 5/1985 | Holland et al. | 73/118 |
| 4,575,117 | 3/1986 | Tatemoto et al. | 280/707 |
| 4,593,920 | 6/1986 | Natsume et al. | 280/707 X |
| 4,611,815 | 9/1986 | Sasage et al. | 280/6 R |
| 4,693,485 | 9/1987 | Kamei et al. | 280/6 R |
| 4,756,548 | 7/1988 | Kaltenthaler et al. | 280/702 |
| 4,761,608 | 8/1988 | Franklin et al. | 73/1 J X |
| 4,787,644 | 11/1988 | Yokote et al. | 280/6 R |
| 4,821,191 | 4/1989 | Ikemoto et al. | 364/424.1 |
| 4,822,063 | 4/1989 | Yopp et al. | 280/840 |
| 4,838,574 | 6/1989 | Baraszu | 280/707 |
| 4,877,263 | 10/1989 | Konishi et al. | 280/707 |
| 4,901,560 | 2/1990 | Hirano et al. | 73/117 |
| 4,962,664 | 10/1990 | Hirano et al. | 73/118.1 |
| 5,068,792 | 11/1991 | Lehr et al. | 364/424.05 |
| 5,083,454 | 1/1992 | Yopp | 73/118.1 |

FOREIGN PATENT DOCUMENTS

| | | | |
|---|---|---|---|
| 0324417 | 7/1989 | Fed. Rep. of Germany . | |
| 58-174007 | 10/1983 | Japan | 280/840 |
| 61-268511 | 11/1986 | Japan | 280/6.1 |
| 88/00313 | 10/1989 | PCT Int'l Appl. . | |

*Primary Examiner*—Tom Noland
*Attorney, Agent, or Firm*—Raymond L. Coppiellie; Clifford L. Sadler

[57] ABSTRACT

An apparatus is disclosed for calibrating a suspension control module of a vehicle to within a preselected tolerance of a predetermined ride height, the vehicle having at least one adjustable suspension unit interposed between the sprung and unsprung vehicle mass. The apparatus includes a first device for measuring a first distance corresponding to an actual ride height of a vehicle and for generating a first signal representative thereof and a second device for measuring a second distance between the vehicle sprung and unsprung mass and for generating a second signal representative thereof. The apparatus also includes a processor operatively associated with the first and second measuring devices for comparing the first and second signals and calculating a deviation between the signals, the processor being operative to generate a third signal corresponding to the deviation and store this deviation in the suspension control module.

13 Claims, 4 Drawing Sheets

APPARATUS AND METHOD FOR CALIBRATING A SUSPENSION CONTROL MODULE

BACKGROUND OF THE INVENTION

1. Field of the Invention

The present invention relates generally to automotive suspension control modules. More particularly, the present invention relates to an apparatus and method for calibrating an automotive suspension control module to within a preselected tolerance of a predetermined ride height.

2. Disclosure Information

Automotive suspensions employing adjustable suspension units typically utilize one or more sensors for detecting the position of one or more portions of the suspension with respect to either another part of the suspension itself or another part of the chassis of the vehicle. In the case of vehicles using load leveling, air, hydropneumatic or hydraulic suspension systems, it is necessary to know the ride height of the vehicle in order to determine whether correction of the ride height is required. In the event, for example, that the ride height is less than prescribed limits, as determined by the height sensor, an adjustable suspension unit may be given the command to increase the ride height. Conversely, in the event that the ride height exceeds the prescribed limits, the adjustable suspension unit may be given the command to lower or decrease the ride height.

Various vehicle height control systems have been proposed including means for maintaining optimal performance of the suspension system. For example, U.S. Pat. No. 4,517,832, assigned to the assignee of the present invention, discloses a method of diagnosing an air suspension system for possible faults within the system. The patent discloses the steps of energizing the air suspension units to the fully extended or rebound position and reading the output signals of the height sensors at that point to check whether the output signal corresponds correctly to the rebound position. The patent further discloses similar steps in checking the height sensor output signal when the air suspension unit is fully deflated as well as at a predetermined trim height. However, the patent does not teach any method for calibrating the vehicle suspension control module in the event that the height sensor output signal does not correctly correspond to the actual ride height of the vehicle. With the advent of analog height sensors which measure the distance between the sprung and unsprung mass of the vehicle in continuous increments, it is especially important that the suspension control module be calibrated to correspond the sensor output signal to the actual ride height of the vehicle.

It is an object of the present invention to provide an apparatus for calibrating a suspension control module which may be utilized in a factory setting in a cost and time efficient manner.

It as an advantage of the present invention that the suspension control module and height sensors may be calibrated without the need for lock-in-place brackets or other tooling.

These and other objects, features and advantages of the present invention will become apparent from the summary, drawings, detailed description and claims which follow.

SUMMARY OF THE INVENTION

According to the present invention, an apparatus for calibrating a suspension control module of a vehicle to within a preselected tolerance of a predetermined ride height, the vehicle having at least one adjustable suspension unit interposed between a sprung and unsprung vehicle mass, comprises first means for measuring a first distance corresponding to an actual ride height of a vehicle and for generating a first signal representative thereof and second means for measuring a second distance between the sprung and unsprung vehicle mass and for generating a second signal representative thereof. The apparatus further comprises processor means operatively associated with the first and second measuring means for comparing the first and second signals and for calculating a deviation between the signals, the processor means generating a third signal corresponding to the deviation and storing the deviation in the suspension control module. The processor means is further operative to adjust the second signal by the deviation to provide correlation between the second signal and the actual ride height of the vehicle.

There is further disclosed herein a method for calibrating a suspension control module of a vehicle to within a preselected tolerance of a predetermined ride height, the vehicle having a suspension system including a plurality of adjustable suspension units interposed between the sprung and unsprung vehicle mass. The method comprises the steps of:

(a) measuring a first distance corresponding to an actual ride height of the vehicle and generating a first signal corresponding thereto, the signal having a first value corresponding to that distance;

(b) measuring a second distance between the vehicles sprung and unsprung mass and generating a second signal corresponding thereto, the second signal having a second value corresponding to that distance;

(c) calculating a deviation between the first value and the second value;

(d) adjusting the second signal by the deviation; and (e) storing the deviation in the memory of the control module.

DETAILED DESCRIPTION OF THE PREFERRED EMBODIMENT

Figure 1:
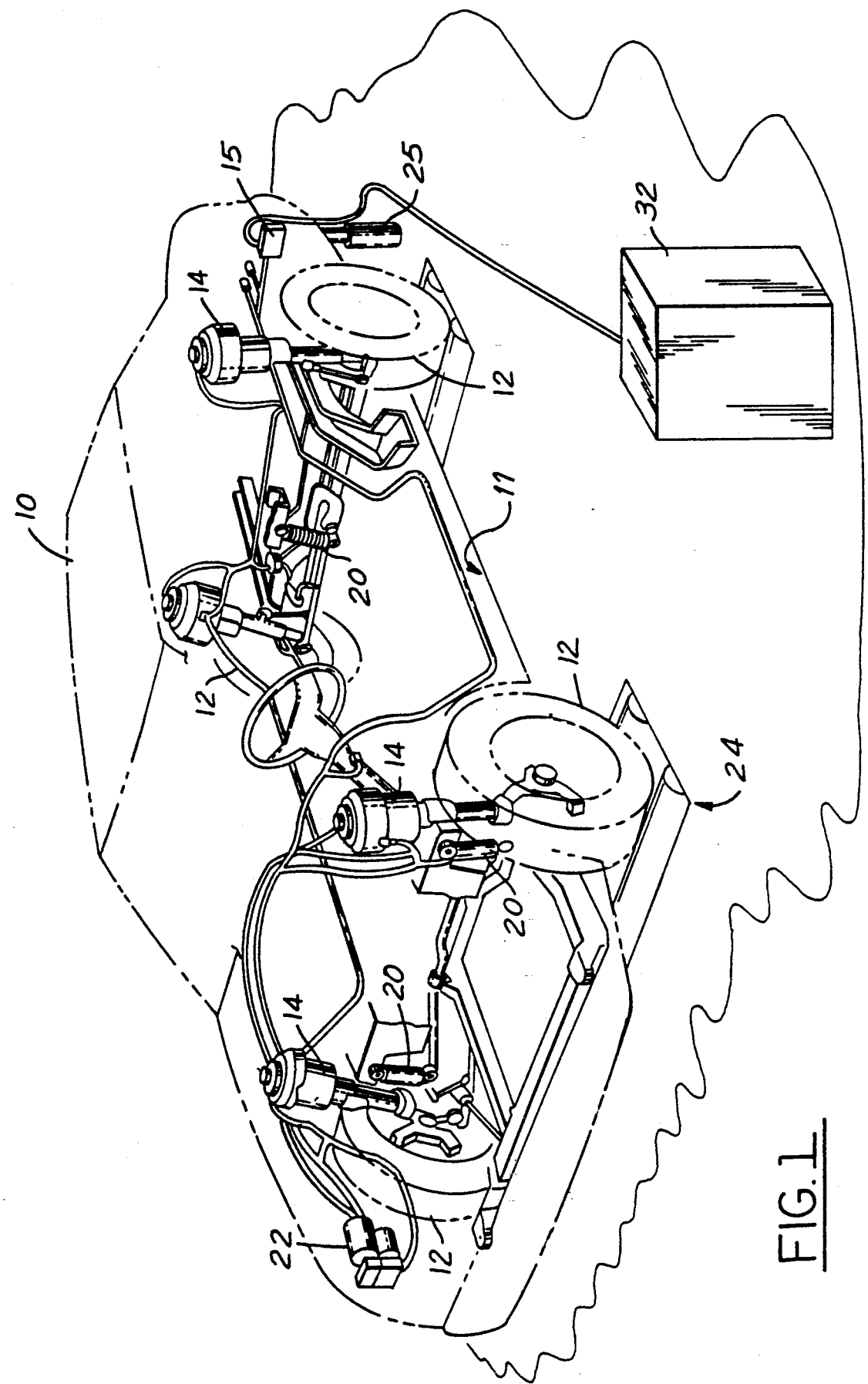
FIG. 1 is a perspective view of a motor vehicle incorporating an apparatus according to the present invention.

Referring now to the drawings, FIG. 1 shows a vehicle 10 positioned above a garage pit 11 subjacent the floor of a garage or manufacturing facility. An operator is stationed in the pit 11 to make various adjustments to the vehicle after the vehicle has been manufactured or for servicing the vehicle 10. The vehicle in FIG. 1 is equipped in conventional fashion with adjustable air spring suspension units 14 which serve to control the vertical motion of the wheel and tire assemblies 12. The air springs are supplied with compressed air by compressor 22 which is electrically powered by the vehicle battery.

Each of the adjustable suspension units 14 is operatively connected with and controlled by suspension control module 15. The control module includes a microprocessor and may be arranged according to a number of different architectures. Those skilled in the art will appreciate in view of this disclosure that each such architecture could generally include an input-output control circuit (I/O) for exchanging data with external devices in a random access memory (RAM) and for temporarily holding data while the data are being processed. Control programs including unit commands will be sequentially read from a read-only memory (ROM). Unit commands will be executed by a central processing unit (CPU). Those skilled in the art will further appreciate in view of this disclosure that the system shown in FIG. 1 represents merely one preferred embodiment of the present invention, it being understood that this invention is suitable for use with other adjustable suspension units such as air-hydraulic or hydraulic load-bearing units or combinations of adjustable load bearing and adjustable damping units such as those known in the art. A system according to this invention could be employed in conjunction with the control of damping, or spring rate, or both functions. This system could also be employed in conjunction with adjustable suspension units having variable ride height or spring load control characteristics.

Figure 3:
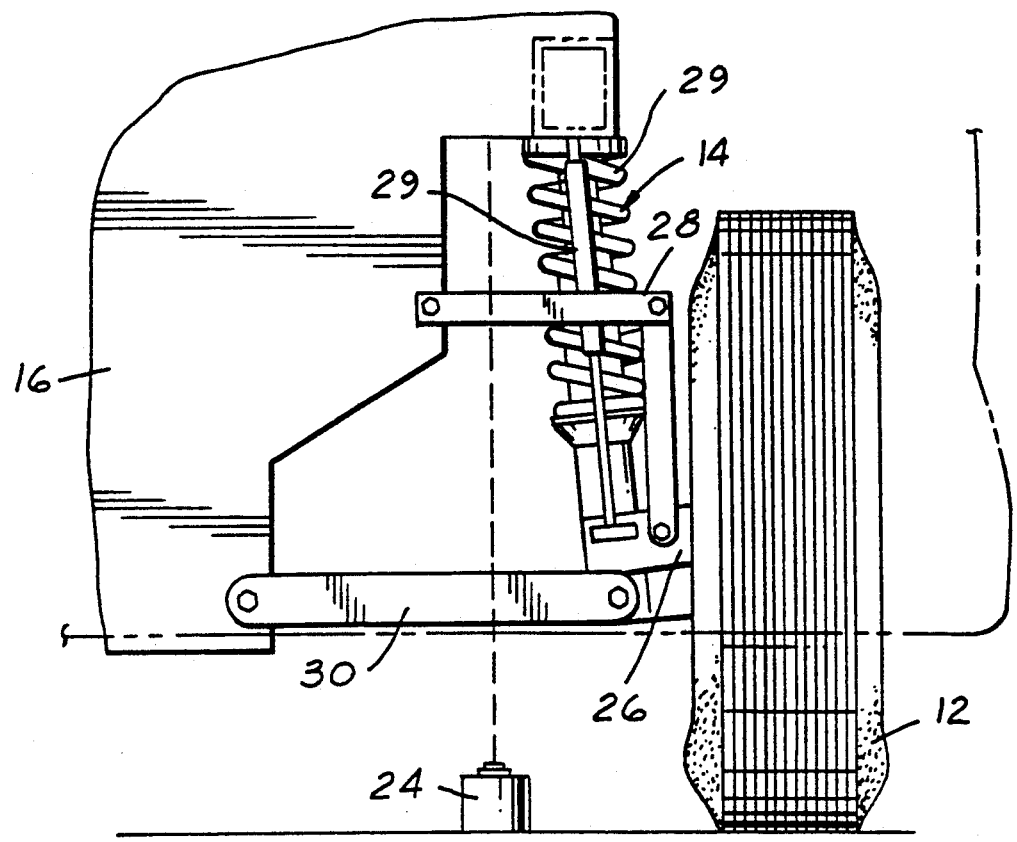
FIGS. 3 and 4 are partial perspective views of vehicles structured in accordance with the principles of the present invention.

As further shown in FIG. 1, the apparatus of the present invention further includes a vehicle height measuring device unit 24, such as a "run out compensation static wheel alignment adjuster" manufactured by the Anzen Motor Car Company Ltd. and as disclosed in U.S. Pat. Nos. 3,453,740; 4,962,664; and 4,901,560, the disclosures of which are herein incorporated by reference. The vehicle height measuring device 24 is positioned over the pit 11 of the manufacturing facility and includes a front and rear set of rollers upon which the front and rear vehicle wheels are placed, respectively. The measurement device 24 includes means for measuring the actual vehicle ride height. Such means may include a linear variable differential transformer 25 electrically connected with the measurement device and which physically contacts the chassis of the vehicle, or some other part of the vehicle which can be mathematically related to the vehicle height, such as the vehicle bumper. As used herein, the term chassis refers to not only a body-on-chassis construction but also a unibody construction. The means for measuring the actual vehicle ride height may also include a sonic transducer, such as shown in FIG. 3, or a laser transducer which generates a signal reflected off part of the vehicle chassis and received by the transducer to determine mathematically the distance between the vehicle and the surface upon which the vehicle is setting. Such information is necessary in order to calibrate the vehicle height sensor output signals.

Figure 4:
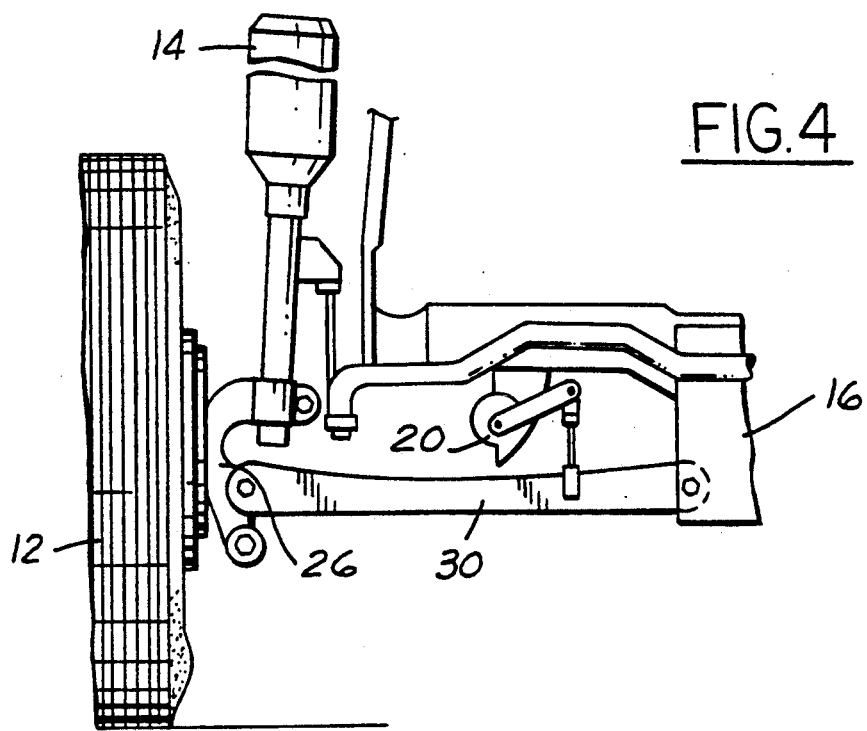

Referring now to FIGS. 3 and 4, two types of suspension systems suitable for use with the present invention are illustrated. As shown in each of these figures, the roadwheel and tire assembly 12 is rotatably supported upon wheel carrier 26, and in each case, a lower control arm 30 is pivotally connected to the wheel carrier 26 at its outboard end and to the body or chassis of the vehicle 16 at its inboard end. In FIG. 3, an upper control arm 28 and coil spring 29 complete the suspension geometry. Upper control arm 28 is pivotally attached at its outboard end to the wheel carrier 26 and at its inboard end to the chassis 16. The suspension unit shown in FIG. 3 further includes an adjustable suspension unit 14 which may have adjustable damping or adjustable load carrying capabilities or both. FIG. 3 further illustrates use of a position sensor 20 which may comprise a linear variable differential transformer (hereinafter "LVDT"), a Hall Effect device or one of a variety of other devices suitable for use according to the present invention. Regardless of the type of suspension position sensor chosen, the sensor generates a signal representing the vertical position of the wheel and tire assembly 12 as the wheel and tire moves through jounce and rebound directions. Also, the height sensor 20 may be of an analog type, generating an exact signal corresponding to each position of the roadwheel and tire assembly with respect to the body or chassis of the vehicle as opposed to known digital sensors which generate a logic "1" or "0" as the roadwheel and tire assembly pass through specific jounce or rebound defined areas.

FIG. 4 illustrates an alternative suspension which may be controlled by an apparatus according to the present invention. As above, an adjustable suspension unit 14 is employed for producing damping within the suspension system and is also capable of controlling the height of the vehicle. The embodiment of FIG. 4 includes a rotary height sensor 20 which may be configures using Hall Effect switches. This sensor utilizes a link and crank arm for converting the up and down motion of the suspension control arm 30 into a rotary motion which may be input into the sensor. Sensor 20 is described in U.S. Pat. No. 4,822,063, which is assigned to the assignee of the present invention and which is hereby incorporated by reference. Other types of position sensors, comprising either variable resistance, variable reluctance, variable capacitance, or Hall Effect sensors or other types of sensor known to those skilled in the art and suggested by this disclosure may be utilized as well.

Figure 2:
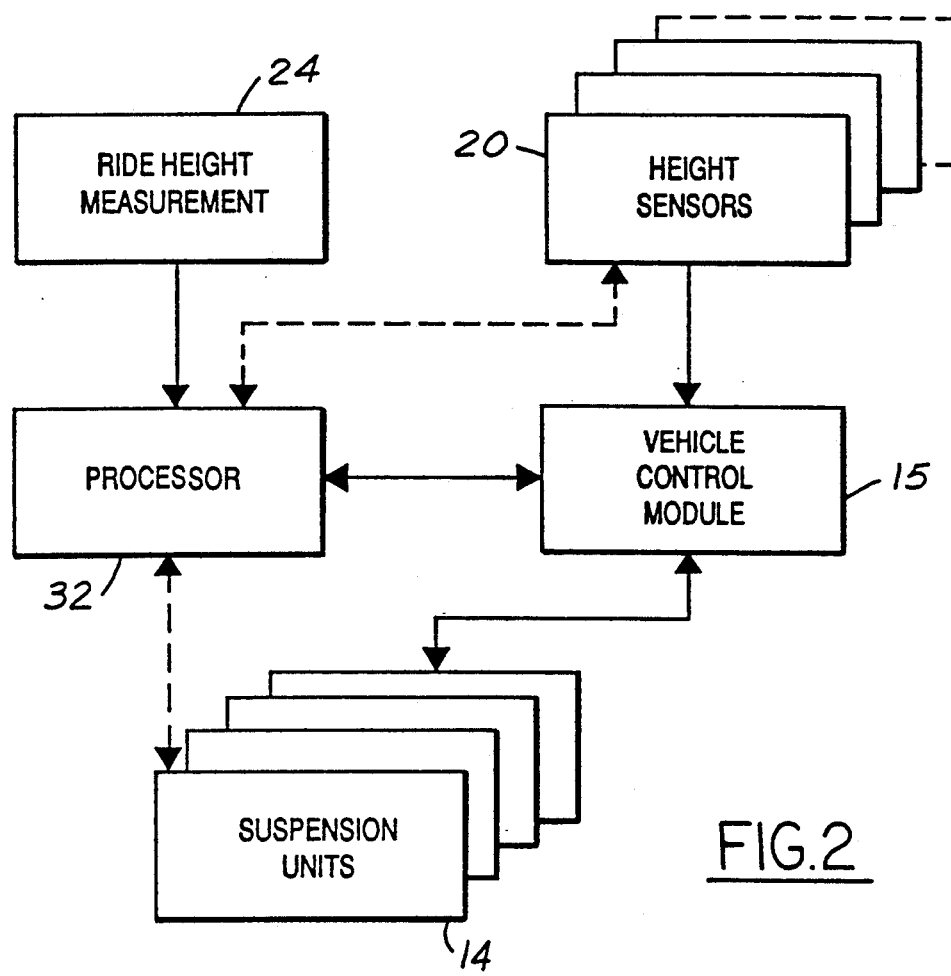
FIG. 2 is an overall system block diagram in accordance with an embodiment of the present invention.

Returning to FIG. 1 and schematically to FIG. 2, the apparatus of the present invention further includes a processor 32 for receiving information from the ride height measuring unit 24 and the vehicle height sensors 20 via the suspension control module 15. As will be explained in greater detail below, the processor 32 compares the height sensor output signal and the actual ride height signal generated by the measurement device and calculates a deviation between the signal values. The processor then adjusts the height sensor output signal by this deviation so that the adjusted height sensor output signal corresponds to the actual vehicle ride height. After an iterative check to determine that the height sensor output signal corresponds to the actual ride height, the processor 32 stores this deviation into the memory of the suspension control module to correlate the height sensor output signal to the actual vehicle ride height. In this respect, proper functioning of the different height control or ride control strategies for the vehicle can be employed because there is proper correlation between the height sensor signal and the actual vehicle ride height.

The control module is calibrated while the position sensor is on the vehicle instead of at the point of manufacture because vehicle attachments are the greatest source of variability of the sensor output signal. For example, if two sensors are installed successively in the same vehicle and the suspension adjusted until the sensor output is 2.5 volts, the suspension position may vary by 0.1 inches. If, however, the same sensors installed on two different vehicles and the suspension adjusted until the sensor output is 2.5 volts, the suspension positions will vary by a much greater amount, perhaps the 0.5 inches. Those skilled in the art will realize that this disclosure is not to be limited to calibrating the module while the sensor is solely on the vehicle, it being understood that the module of the present invention may be calibrated also when the sensor is independent of the vehicle.

Figure 6:
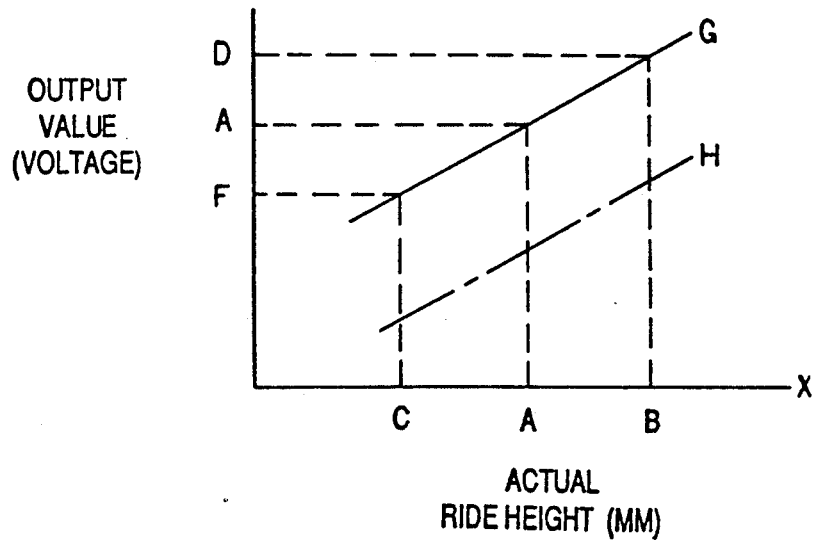
FIG. 6 is a graphic representation of a transfer function utilized in the present invention.
Figure 5:
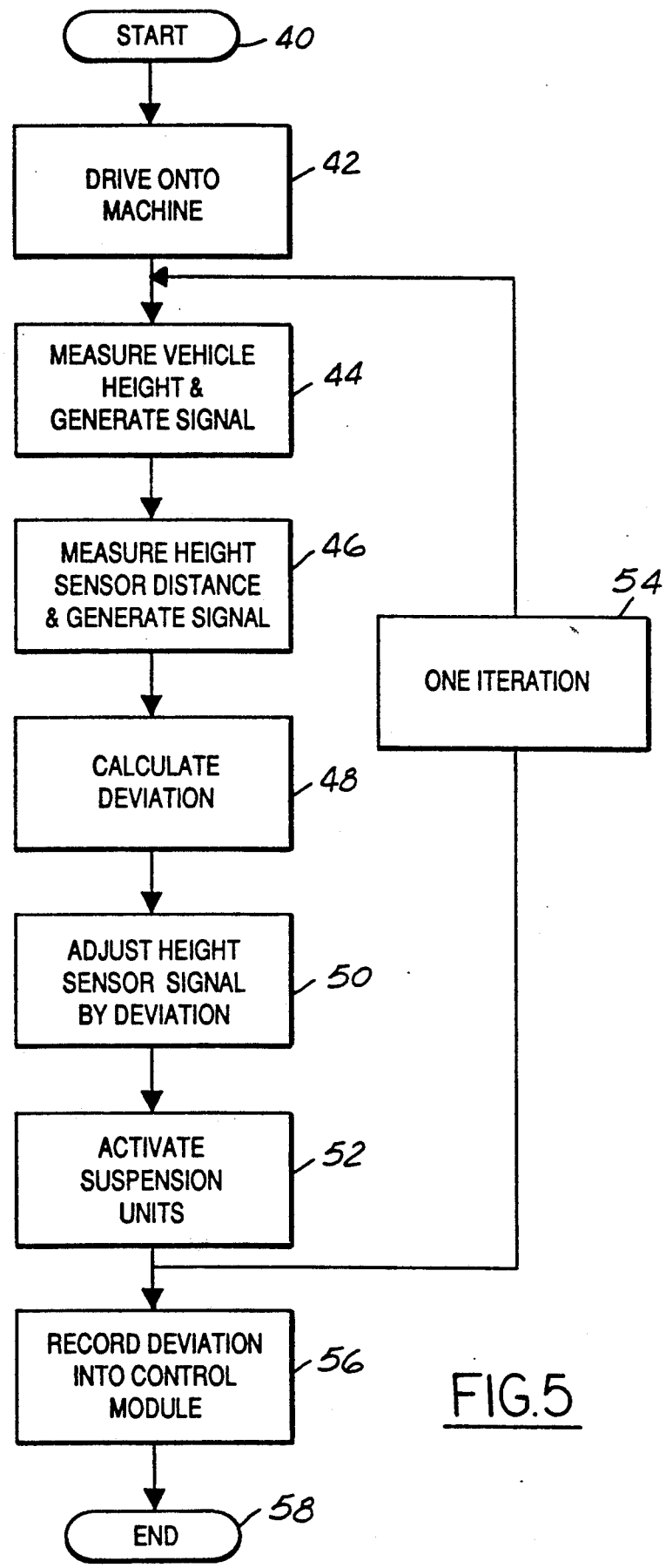
FIG. 5 is a logical block diagram of a method of the present invention.

FIG. 5 shows a logic flow block diagram of a method of the present invention for calibrating a suspension control module of a vehicle to within a preselected tolerance of a predetermined ride height. As shown in FIG. 1 the vehicle 10 includes a plurality of suspension unit 14 which are interposed between the sprung and unsprung vehicle mass, the sprung vehicle mass being the chassis 16 while the unsprung mass includes, inter alia, suspension components such as the lower control arm 30 and the tire and wheel assembly 12. Starting at block 40 of FIG. 5, the first step of the method is to drive the vehicle 10 onto the Anzen machine as shown in block 42. It should readily be apparent to those skilled in the art that the method of the present invention may be performed with devices other than an Anzen machine, it being necessary only to have a device which can measure the actual vehicle ride height and generate a signal corresponding to that height. At block 44 the actual vehicle ride height is measured by any of the measuring devices described above, such as the sonic transducer or a linear variable displacement transducer, and that signal is sent to the processor 32. At block 46, the height sensors 20, measure the distance between their respective mounting points between the sprung and unsprung vehicle mass and that signal is sent to the processor 32 as well. The processor 32 then converts the actual vehicle ride height position into a value equivalent to that received by the height sensor, such as voltage. When both of the signals, the first signal from the actual ride height measurement tool and the second signal from the height sensors, are in equivalent units, which is done by the processor by means of a linear transfer function known to those skilled in the art, the processor 32 calculates a deviation or a difference between the two values at block 48. FIG. 6 shows a graphic representation of the transfer function used by the processor of the present invention and the method to calibrate the suspension control module. An example utilizing this transfer function will be described after the method of the present invention is disclosed.

After calculating the deviation or the difference between the actual ride height signal and the height sensor output signal, the processor, at block 50, adjusts the height sensor output signal by an amount equal to the difference between the two signals so that there is a correspondence or correlation between the height sensor output signal and the actual ride height of the vehicle. It can be assumed throughout the method of the present invention that the height sensors utilized in a vehicle employing the present invention, especially those of analog type sensors, may be incorrectly calibrated at their point of manufacture or that the amount of discrepancy between the mounting points on the height sensors at the various locations within the vehicle tend to be off due to the bending or skewing of the vehicle body as explained above. As such, the height sensor output signal may not necessarily correspond to the actual vehicle ride height.

After the output signal has been adjusted at the height sensor, the processor actuates all of the suspension units to put the vehicle at its desired trim height at block 52. Trim height in a vehicle is typically 18 inches (0.46 meters) with a predetermined tolerance of plus or minus 0.5 inches (12.7 mm). It should be readily apparent to those skilled in the art that the present invention is not meant to be limited to these values, that each vehicle may correspondingly have a different trim ride height. After the suspension units are actuated, the processor does a reiterative check at block 54 to determine whether the height sensor output signal is correlated to the actual vehicle ride height. If it is, the deviation is permanently burned into a non-volatile memory of the suspension control module at block 56. It should be readily apparent to those skilled in the art that other types of memories within the suspension control module could be utilized in place of the non-volatile memory. The present invention is not meant to be limited solely to the suspension control module having a non-volatile memory.

Referring now to FIG. 6, a plot of the transfer function used in calibrating a suspension control module according to the method of the present invention is designated by line G. Output value, such as voltage, is plotted on the y-axis or the ordinate, while actual ride height, in millimeters, is plotted on the abscissa, or x-axis. Assuming that point A on the x-axis relates to a predetermined ride height, such as trim, this trim ride height position has an equivalent output value or voltage, point A on the y-axis, as determined by the transfer function, line G: $G=(mX+b)$ wherein m is the slope of line G and b is an offset. It is necessary to convert the signal from the actual ride height measuring device 24 into the same units as the height sensor output signals so that the processor can compare the like signals to determine whether an adjustment to the control module is needed. The transfer function above allows the signal from the ride height measurement device to be converted into a signal having the same units of measurement as are output from the height sensors, such as voltage. Other types of signals may be used as well in the present invention, such as pulse width modulated signals, frequency modulated signals, digital, non-linear or current loop signals.

An example of how the present invention calibrates a suspension control module will now be described. If the actual ride height of the vehicle is below the trim level (point A, x-axis), such as shown by point C on the x-axis, the processor utilizes the transfer function, line G, to calculate an equivalent output value, shown as point F on the y-axis. In one possible situation, the height sensors 20 may be generating a signal having an output value corresponding to point D, y-axis, which corresponds to an actual ride height position shown at point B, x-axis, even though the actual vehicle height is at point C, x-axis. This output value at B exceeds the trim output value, point A, y-axis, which indicates to the suspension control module that the height of the vehicle should be reduced, whereas in actuality, the vehicle height needs to be increased. The processor of the present invention receives the signal from the ride height measuring device, point C, converts it to an equivalent output value, F, and receives the height sensor output signal, point D. The processor then calculates the deviation between the two values, corresponding to an output value equal to D minus F. In the present example, this deviation would be a negative value since the actual ride height is lower than the height sensor output signal. The processor then adjusts the height sensor output signal by the deviation (D−F) and adjusts the transfer function line by this offset so that the equation of the transfer function is now: G=mX+(D−F). This corresponds to the line shown as "H" in FIG. 6. As can be seen on line H, the output voltage of the intersection of point B with line H now corresponds to the same output value voltage as point F on the ordinate. The processor then stores this new transfer function into the memory of the suspension control module so that the suspension control module is calibrated to correlate the height sensor output signal to the actual vehicle ride height. All future readings of the height sensor signals will then be offset by the deviation to maintain a correct correlation between the actual vehicle ride height and height sensor signal value.

Those skilled in the art will appreciate in view of this disclosure that various modifications and permutations of the present invention are possible without departing from the scope of the appended claims.

What is claimed is:

1. An apparatus for calibrating a suspension control module of a vehicle to within a preselected tolerance of a predetermined ride height, said vehicle having at least one adjustable suspension unit interposed between a sprung and unsprung vehicle mass, said apparatus comprising:

first means for measuring a first distance corresponding to an actual ride height of said vehicle and for generating a first signal representative thereof;
  second means for measuring a second distance between said vehicle sprung and unsprung mass and for generating a second signal representative thereof; and
  processor means operatively associated with said first and second measuring means for comparing said first and second signals and for calculating a deviation between said signals, said processor means operative to generate a third signal corresponding to said deviation and to store said deviation in said control module.

2. An apparatus according to claim 1, wherein said processor means is operative to adjust said second signal by said deviation to provide correlation between said second signal and said actual ride height.

3. An apparatus according to claim 1, wherein said first means comprises a linear transducer operative to measure said ride height at a vehicle bumper.

4. An apparatus according to claim 1, wherein said first means comprises a laser measuring tool operative to generated a laser signal and to receive a reflection of said signal from the vehicle chassis and to calculate distance therefrom.

5. An apparatus according to claim 1, wherein said first means comprises a sonic transducer operative to generated a signal and to receive a reflection of said signal from the vehicle chassis and to calculate distance therefrom.

6. An apparatus according to claim 1, wherein said second means comprises a linear height sensor.

7. An apparatus according to claim 1, wherein said second means comprises a linear voltage displacement transducer.

8. An apparatus according to claim 1, wherein said second means comprises a rotary height sensor.

9. An apparatus for calibrating a suspension control module of a vehicle to within a preselected tolerance of a predetermined ride height, said vehicle having a plurality of adjustable suspension units interposed between a sprung and unsprung vehicle mass, said apparatus comprising:

first means for measuring a first distance corresponding to an actual ride height of said vehicle and for generating a first signal representative thereof;
  at least three height sensors disposed between said sprung and unsprung vehicle masses, said height sensors being operative to generate a second set of signals corresponding to the distance between said sprung and unsprung mass; and
  processor means operatively associated with said first and second measuring means for comparing said first signal and second set of signals and for calculating a deviation between said signals, said processor means being operative to adjust said second set of signals by said deviation to provide, correlation between said second set of measured signals to said actual vehicle ride height to calibrate said control module.

10. An apparatus according to claim 9, wherein said processor means includes a nonvolatile memory operative to store said deviation.

11. An apparatus according to claim 10, wherein said height sensors comprise analog height sensors.

12. A method for calibrating a suspension control module of a vehicle to within a preselected tolerance of a predetermined ride height, said vehicle having a suspension system including plurality of adjustable suspension units interposed between a sprung and unsprung vehicle mass, said method comprising the steps of:

(a) measuring a first distance corresponding to an actual ride height of said vehicle and generating a first signal corresponding thereto, said signal having a first value corresponding to said distance;
  (b) measuring a second distance between said vehicle sprung and unsprung mass and generating a second signal corresponding thereto, said second signal having a second value corresponding to said distance;
  (c) calculating a deviation between said first value and said second value;
  (d) adjusting said second signal by said deviation; and
  (e) storing said deviation into a memory of said control module.

13. A method for calibrating a suspension control module according to claim 12, further including the step of: (f) actuating said vehicle suspension units and reiterating steps (a)–(d) before said deviation is stored in said memory.

* * * * *